(12) United States Patent
Nakatani et al.

(10) Patent No.: US 6,506,353 B2
(45) Date of Patent: Jan. 14, 2003

(54) PROCESS AND APPARATUS FOR PRODUCING IRON CARBIDE

(75) Inventors: Junya Nakatani, Kobe (JP); Yoshio Uchiyama, Akashi (JP); Eiji Inoue, Kobe (JP); Torakatsu Miyashita, Kobe (JP)

(73) Assignees: Kawasaki Jukogyo Kabushiki Kaisha, Hyogo (JP); Mitsubishi Corporation, Tokyo (JP)

( * ) Notice: Subject to any disclaimer, the term of this patent is extended or adjusted under 35 U.S.C. 154(b) by 0 days.

(21) Appl. No.: 09/269,777

(22) PCT Filed: Jan. 13, 1997

(86) PCT No.: PCT/JP97/00087

§ 371 (c)(1),
(2), (4) Date: Mar. 31, 1999

(87) PCT Pub. No.: WO98/30497

PCT Pub. Date: Jul. 16, 1998

(65) Prior Publication Data

US 2001/0048913 A1 Dec. 6, 2001

(51) Int. Cl.[7] ............................................. C01B 31/30
(52) U.S. Cl. ..................................................... 423/439
(58) Field of Search ......................................... 423/439

(56) References Cited

U.S. PATENT DOCUMENTS

| | | | |
|---|---|---|---|
| 3,236,607 A | | 2/1966 | Porter et al. ................. 422/141 |
| 5,118,479 A | * | 6/1992 | Stephens, Jr. et al. ...... 423/439 |
| 5,837,031 A | * | 11/1998 | Miyashita et al. ............. 75/525 |

* cited by examiner

*Primary Examiner*—Stuart L. Hendrickson
(74) *Attorney, Agent, or Firm*—Oppenheimer Wolff & Donnelly LLP

(57) ABSTRACT

Iron carbide is produced by an apparatus comprising first fluidized bed reactor 4 and second fluidized bed reactor 5, wherein the charged grainy iron oxide is reduced and carburized by the high temperature and high pressure gas being introduced from the bottom of the reactor. Both fluidized bed reactors comprise chamber 23 for introducing gas into the reactor, distribution plate 27 having multiple gas-introducing nozzles 28, partition plate 26 partitioning the fluidized bed into plural division rooms, and gas supply inlet 25a, 25b arranged on chamber 23 for supplying gas to specific division room respectively. Each gas supply inlet is connected to gas supply line having a gas flow control valve for controlling gas pressure or gas flow rate.

20 Claims, 6 Drawing Sheets

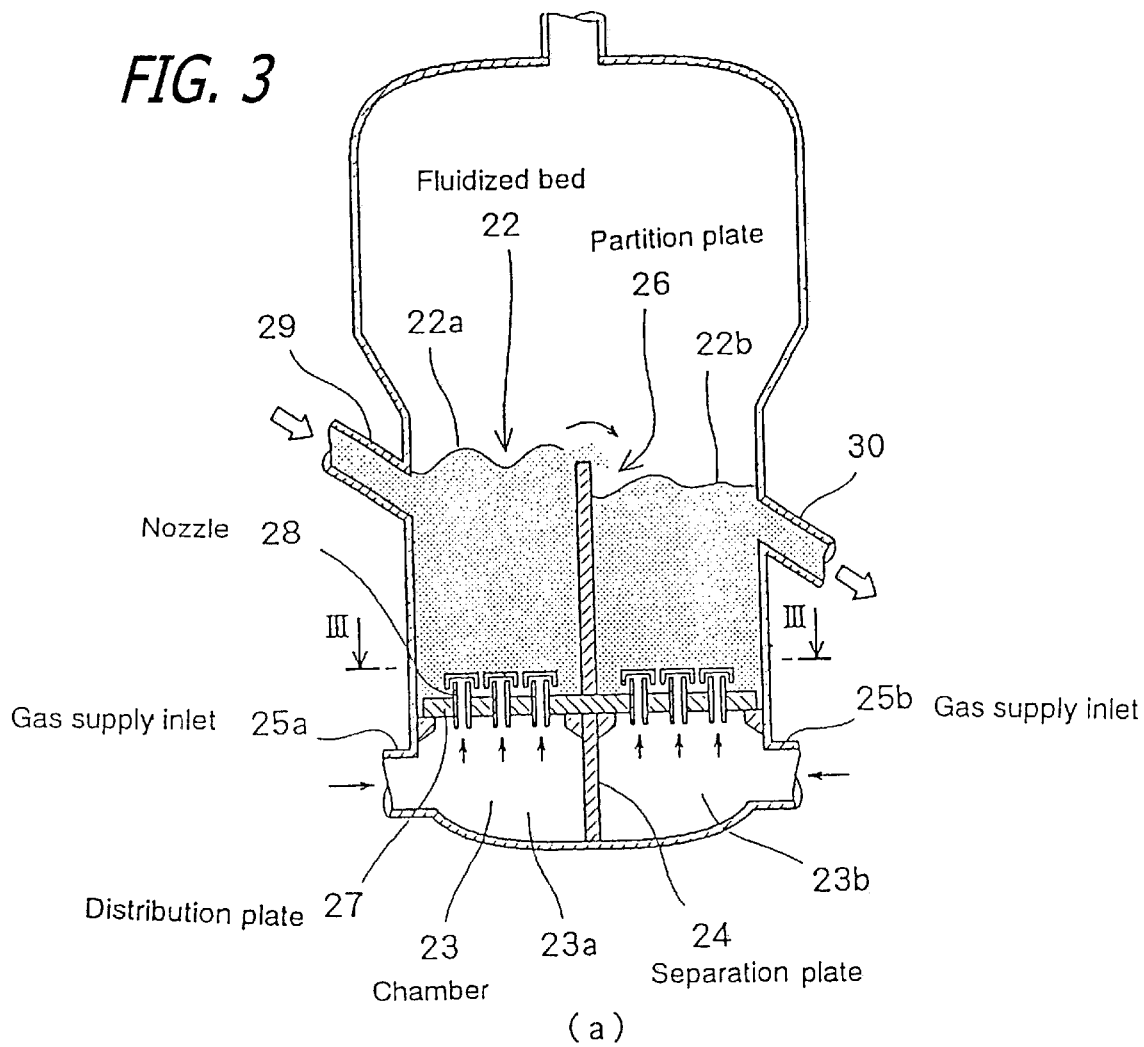
FIG. 3
(a)
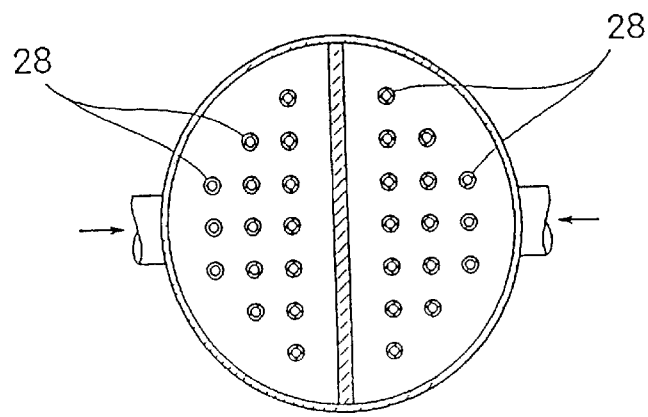
(b)

FIG. 6
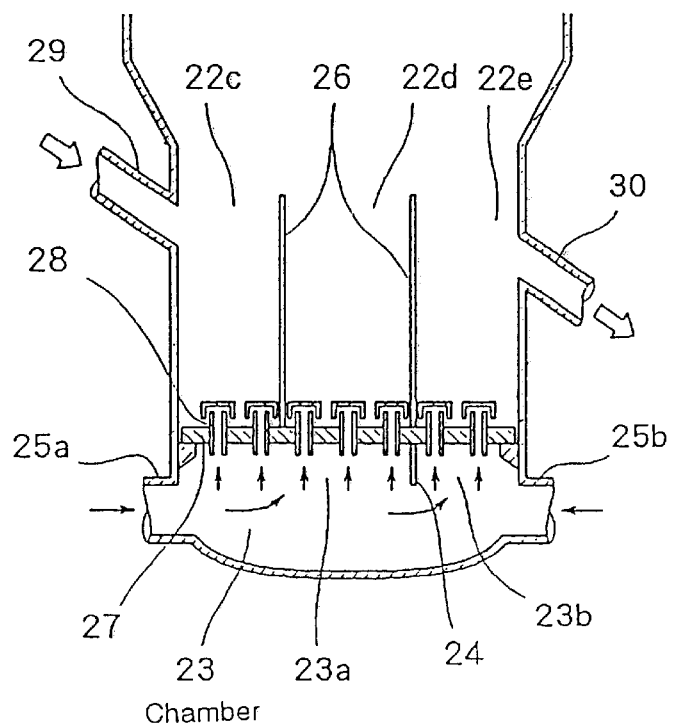
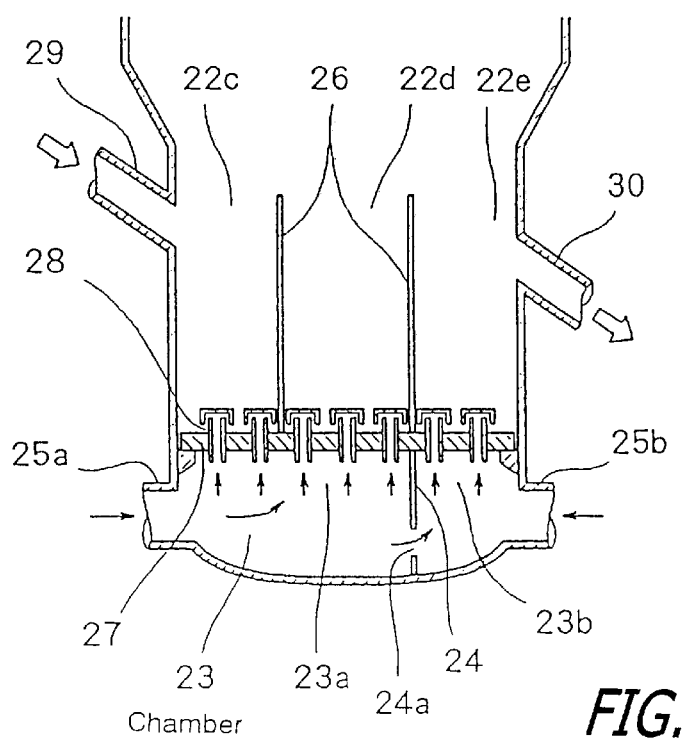
FIG. 7

FIG. 8
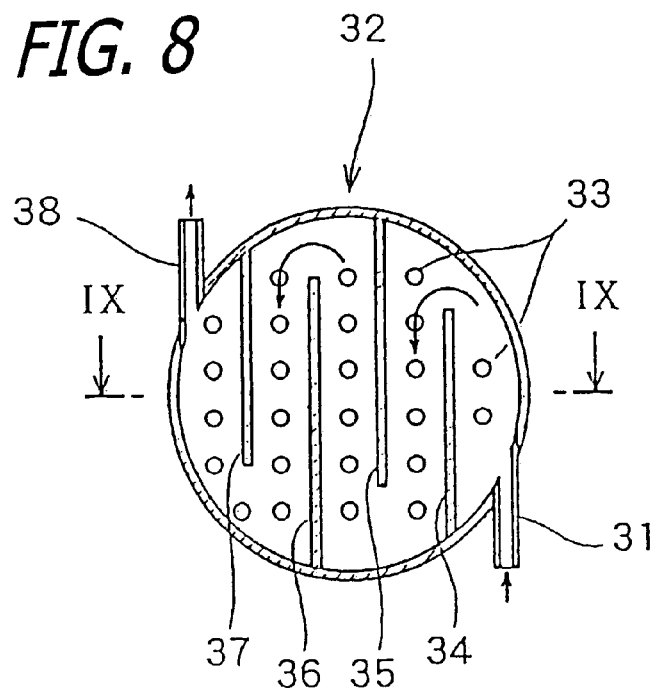
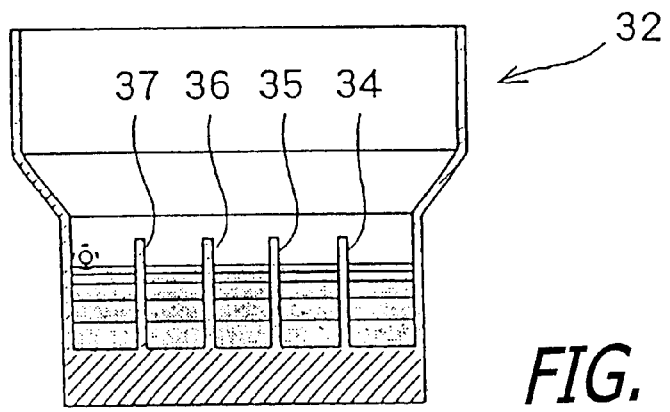
FIG. 9

PROCESS AND APPARATUS FOR PRODUCING IRON CARBIDE

TECHNICAL FIELD

The present invention relates to a process and apparatus for producing iron carbide.

BACKGROUND ART

A traditional method for producing steel from iron oxide such as iron ore normally comprises the steps of;

in the first step, producing molten pig iron in such a manner that coke produced at a coke oven, other raw materials and iron oxide are charged into a blast furnace, and thereafter, iron oxide are molten and reduced by combustion heat of carbon contained in coke generated due to blowing of high temperature oxygen and carbon monoxide generated due to combustion of said carbon;

in the second step, charging the molten pig iron into a converter, and converting the molten pig iron by oxygen blowing into steel, wherein a carbon concentration of which is under the demanded value.

Since such traditional steel making process by a blast furnace requires many ancillary facilities such as coke oven, sintering furnace, and air-heating furnace, equipment cost becomes high. Furthermore, this steel making process via a blast furnace requires the expensive coal such as high coking coal and huge site for many facilities and raw materials storage. Therefore, recently, to overcome the above disadvantages of using a blast furnace, new iron making processes, instead of a blast furnace, have been developed and put to practical use.

For example, one of the newly developed processes for producing steel is a method called as iron carbide-electric furnace process. This process comprises the steps of obtaining iron carbide by reacting grainy iron oxide with a reducing agent such as hydrogen and a carburizing agent such as methane gas, and producing steel by smelting said iron carbide at an electric furnace. A fluidized bed reactor is a well known apparatus for producing iron carbide. The laid open publication No. HEI 6-501983, which is the publication of the Japanese translation of International Patent Application No. PCT/US91/05198 discloses an apparatus for producing iron carbide. As shown in FIG. 8, said publication shows an apparatus for producing iron carbide, wherein when a grainy iron oxide is charged into fluidized bed reactor 32 via inlet 31, the grainy iron oxide is reduced under floating and fluidizing due to the high temperature and high pressure gas being introduced from multiple nozzles 33 located in the bottom portion of the reactor. Thereafter, the iron oxide is broken into smaller pieces as a result of the foregoing reaction and moves along with a passage formed by baffle-plates 34, 35, 36, 37, and is finally discharged as iron carbide from outlet 38. (Hereinafter, this apparatus is called as prior art.)

By the way, the reaction for converting iron oxide into iron carbide proceeds as shown in the following formulas (1) through (6).

(1) $Fe_2O_3+3H_2 \rightarrow 2Fe+3H_2O$ $(FeO_{1.5}+1.5H_2 \rightarrow Fe+1.5H_2O)$ (2) $Fe_3O_4+4H_2 \rightarrow 3Fe+4H_2O$ $(FeO_{1.3}+1.3H_2 \rightarrow Fe+1.3H_2O)$ (3) $Fe_3O_4+H_2 \rightarrow 3FeO+H_2O$ (4) $FeO+H_2 \rightarrow Fe+H_2O$ (5) $3Fe+CH_4 \rightarrow Fe_3C+2H_2$ (6) $3Fe_2O_3+5H_2+2CH_4 \rightarrow 2Fe_3C+9H_2O$ As shown in the above formulas (1) through (6), the iron oxide is converted into iron carbide in turn of $Fe_2O_3$, $Fe_3O_4$, FeO, Fe and $Fe_3C$, and the volume of the reducing gas $H_2$ to be used varies according to each stage in the reducing reaction. On the other hand, under some gas temperature or some gas composition, there is such a case that FeO is not generated. As is described below, the prior art has the various problems to be solved.

First, the higher the concentration of methane and carbon monoxide contained in the reducing and carburizing gas becomes, the faster the carburizing reaction proceeds. But when the concentration of methane and carbon monoxide contained in said reaction gas becomes excessively high, a fixed carbon is generated from the reaction gas due to the reaction as shown in the following formulas (7) and/or (8). As a result, extra reaction gas is uselessly consumed. Furthermore, the fixed carbon has such a bad effect upon the gas circulation loop as to be turned into dust and sticked on a tube of gas heater.

(7) $CH_4 \rightarrow C(\text{fixed carbon})+2H_2$ (8) $2CO \rightarrow C(\text{fixed carbon})+CO_2$ At the most vigorous stage of the reaction, the reducing reaction by hydrogen is conducted vigorously as is described above, and the water vapor generated by said reducing reaction prevent the generation of fixed carbon. But, at the final stage of the reaction, since little water vapor for preventing the generation of fixed carbon is generated, the fixed carbon is liable to easily generate. There are two means to prevent the generation of fixed carbon. One is to decrease the concentration of methane and carbon monoxide contained in the reaction gas, and the other is to increase the concentration of water vapor contained in the reaction gas. But those means result in the decline of the reaction speed, namely, the lowering of the productivity.

The higher the gas temperature becomes, the faster the reaction speed becomes. But, when the temperature of the fluidized bed comes to be over about 600° C. (for example, 570° C.~590° C.) due to the excessively high temperature gas, the iron oxide remained in the product of iron carbide is turned into not $Fe_3O_4$ whose chemical character is stable, but FeO whose chemical character is unstable.

If the reaction gas temperature is decreased so as to avoid the above disadvantage, it will result in the decline of the reaction speed, namely, the lowering of the productivity.

Furthermore, as the reaction proceeds, the specific gravity of iron oxide becomes lower and the diameter of iron oxide particles become smaller due to its own powdering. Therefore, the iron oxide particles at the stage of the second half of the reaction is liable to fly. The iron oxide particles flown outside the reactor has the low carburization degree because of the short staying time at the reactor. As a result, it brings the lowering of the average carburization degree of the product of iron carbide.

Consequently, it is preferable to regulate the flow velocity of the gas flowing through the fluidized bed according to the proceeding of the reaction. But it is impossible for the prior art to change the flow velocity of the gas, unless applying some complicated works, such as alternating the resistance of the gas blowing nozzle installed at the gas distribution plate.

Furthermore the method for producing iron carbide, which is characterized by that the reducing reaction is partially conducted in a first stage reactor, then the further reducing and carburizing reaction is conducted in a second stage reactor, is known.

But in this method, the control of reduction degree of the ore discharged from the first stage reactor is necessary. It is possible to control the reduction degree by altering the gas flow rate, the gas temperature or the gas composition. Said altering, however, is not easy because the quantity of gas to deal with is so much. As a result, it presents the difficulty in controlling conformably and carefully the reduction degree.

The above-mentioned disadvantages of the prior art for producing iron carbide will be easily overcome by the present invention.

The objective of the present invention is to provide a process and apparatus for producing effectively iron carbide having the chemically stable components.

DISCLOSURE OF THE INVENTION

An object of this invention is to provide a process for producing iron carbide by an apparatus having constitution elements (a) to (e);

(a) a fluidized bed located at an upper part within a fludized bed reactor, and, (b) a chamber located at a lower part within the reactor to work as a gas header for introducing a reducing and carburizing gas; wherein the fluidized bed and the chamber are separated into upside and downside by a distribution plate on which multiple gas introducing nozzles are installed; and the fluidized bed located at an upper part of the distribution plate is partitioned into plural division rooms which are formed in isolated or mazy room by a partition plate; and, (c) plural gas supply inlets arranged on the chamber for supplying gas respectively to the specific division room, and, connecting a gas supply line to each gas supply inlet in order to supply a reducing and carburizing gas, wherein each gas supply line has a gas flow control valve which controls gas pressure or gas flow rate; and, (d) one or more than two of gas circulation loop having a quenching tower and a cooler which eliminate dusts contained in the exhaust gas and reduce water vapor contained in the exhaust gas, and having a preheater for heating the gas, wherein the exhaust gas is returned to the chamber by way of the quenching tower, cooler and preheater; and, (e) a gas supplying apparatus through which hydrogen gas and carbon-containing gas such as methane are supplied to a gas circulation loop; and further, comprising steps for reacting grainy iron oxide charged from a side wall of the reactor with the gas in such a manner that;

the iron oxide is floated and fluidized by high temperature and high pressure gas being introduced form the bottom portion of the reactor, and then, transferred from the division room of the upstream side to the division room of the downstream side via a communication space which may locate at either upper or lower part of said partition plate, and finally, produced iron carbide is discharged from the final division room.

Another object of the present invention is to provide a process for producing iron carbide, wherein a chamber is separated into plural parts by separation plate and each separated part comprises an individual gas supply inlet respectively.

Another object of the present invention is to provide a process for producing iron carbide, wherein a separation plate is installed at the upper part of the chamber in such a manner that only the upper part of the chamber is divided into plural parts by said separation plate.

Another object of the present invention is to provide a process for producing iron carbide, wherein a separation plate is installed from the top of the chamber to the bottom thereof for isolating each separation part.

Another object of the present invention is to provide a process for producing iron carbide, wherein a separation plate is installed from the top of the chamber to the bottom thereof for separating the chamber into plural parts, and the separated parts are communicated each other via an aperture arranged on the separation plate.

Another object of the present invention is to provide a process for producing iron carbide wherein the amount of water vapor contained in the gas to be supplied to the division room of the downstream side is made larger than that contained in the gas to be supplied to the division room of the upstream side.

Another object of the present invention is to provide a process for producing iron carbide, wherein the amount of water vapor contained in the gas to be supplied to the division room of the downstream side is increased by supplying water vapor from the outside of the reactor.

Another object of the present invention is to provide a process for producing iron carbide, wherein the amount of water vapor contained in the gas to be supplied to the division room of the downstream side is increased in such a manner that cooling operation of a quenching tower and a cooler in a gas circulation loop is regulated so as to decrease the amount of removal of water vapor by said quenching tower and said cooler.

Another object of the present invention is to provide a process for producing iron carbide, wherein the hydrocarbon gas or the carbon monoxide gas contained in the gas to be supplied to the division room of the downstream side is made smaller than that contained in the gas to be supplied to the division room of the upstream side.

Another object of the present invention is to provide a process for producing iron carbide, wherein the amount of the hydrocarbon gas or the carbon monoxide gas contained in the gas to be supplied to the division room of the upstream side is increased by supplying hydrocarbon gas or carbon monoxide gas from the outside of the reactor more than that contained in the gas to be supplied to the division room of the downstream side.

Another object of the present invention is to provide a process for producing iron carbide, wherein the gas flow rate per unit area of the gas to be supplied to the division room of the downstream side is made smaller than that of the gas to be supplied to the division room of the upstream side.

Another object of the present invention is to provide a process for producing iron carbide, wherein the temperature of the gas to be supplied to the division room of the downstream side is made lower than that of the gas to be supplied to the division room of the upstream side.

Another object of the present invention is to provide a process for producing iron carbide, wherein the temperature of the gas to be supplied to the division room of the downstream side is made lower than that of the gas to be supplied to the division room of the upstream side in such a manner that a low temperature gas is mixed with the gas discharged from the preheater in the gas circulation loop.

Another object of the present invention is to provide a process for producing iron carbide, wherein the low temperature gas is a part of the gas to be supplied to a preheater.

Another object of the present invention is to provide a process for producing iron carbide, wherein the low temperature gas is supplied from the outside of the reactor.

Another object of the present invention is to provide a process for producing iron carbide, wherein the temperature of the fluidized bed in the division room of the downstream side is made in the range of 500~600° C.

Another object of the present invention is to provide a process for producing iron carbide, wherein the temperature of the fluidized bed in the last division room of the downstream side is made in the range of 500~600° C. by decreasing the temperature of only the gas to be supplied to the last division room of the downstream side.

Another object of the present invention is to provide a process for producing iron carbide, wherein the temperature of the gas to be supplied to the division room of the downstream side is made lower than that of the gas to be supplied to the division room of the upstream side in such a manner that oxygen is mixed with the gas to be supplied to division room of the upstream side, and then, a part of combustible gas contained in said gas is partially burned in order to raise the gas temperature.

Another object of the present invention is to provide a process for producing iron carbide, wherein the concentration of hydrogen contained in the gas to be supplied to the division room of the upstream side is made higher than that of hydrogen contained in the gas to be supplied to the division room of the downstream side.

A still further object of the present invention is to provide a process for producing iron carbide, wherein the concentration of the hydrogen in the gas to be supplied to the division room of the upstream side is increased by supplying hydrogen gas from the outside of the reactor.

Another aspect of this invention is to provide an apparatus for producing iron carbide comprising the constitution elements (a) to (e);

(a) a fluidized bed located at an upper part within a fludized bed reactor, and, (b) a chamber located at a lower part within the reactor to work as a gas header for introducing a reducing and carburizing gas; wherein the fluidized bed and the chamber are separated into upside and downside by a distribution plate on which multiple gas introducing nozzles are installed; and the fluidized bed located at an upper part of the distribution plate is partitioned into plural division rooms which are formed in isolated or mazy room by partition plate; and, (c) plural gas supply inlets arranged on the chamber for supplying gas respectively to the specific division room; and, connecting a gas supply line to each gas supply inlet in order to supply a reducing and carburizing gas; wherein each gas supply line has a gas flow control valve which controls each gas pressure or gas flow rate; and, (d) one or more than two of gas circulation loop having a quenching tower and a cooler which eliminate dusts contained in the exhaust gas and reduce water vapor contained in the exhaust gas, and having a preheater for heating the gas, wherein the exhaust gas is returned to the chamber by way of the quenching tower, cooler and preheater; and, (e) a gas supplying apparatus through which hydrogen and carbon- containing gas such as methane are supplied to said gas circulation loop.

$H_2$, $CH_4$, $CO$, $CO_2$ and $H_2O$ and the like can be used as a reaction gas for the present invention.

The present process and apparatus for producing iron carbide having the above constructions demonstrates the following advantages.

That is to say, it can be conducted by the present invention that the gas conditions such as gas temperature, gas flow rate and gas composition, which is introduced into the fluidized bed of iron oxide particle inside the reactor, may not make fixed but partially changed.

Consequently, it is possible to lower the concentration of methane and carbon monoxide and raise the concentration of water vapor contained in the gas introduced into the division room of the downstream side in comparison with the concentration of those gases contained in gas introduced into the division room of the upstream side. It thus can be achieved to maintain a high productivity operation under preventing the generation of fixed carbon from the reaction gas.

It is possible to lower the gas temperature introduced into the division room of the downstream side in comparison with the gas temperature introduced into the division room of the upstream side. It thus can be achieved to maintain a high productivity operation and produce iron carbide having a small quantity of chemically unstable wustite and a large quantity of chemically stable magnetite.

Furthermore, it is possible to decrease the gas flow rate introduced into the division room of the downstream side in comparison with the gas flow rate introduced into the division room of the upstream side according to the decreasing specific gravity and particle diameter in accordance with the proceeding of the reaction. It thus can be achieved to decrease the iron oxide flown the outside the reactor and produce iron carbide having a high average carburization ratio.

In case of conducting the reducing and carburizing reaction using two reactors, it is easy to alter the gas flow rate, the gas composition and/or the gas temperature because the gas quantity introduced into the division room of the fluidized bed at the final reaction stage of the first reactor is smaller than the whole gas quantity. It thus can easily be achieved to control the reduction degree of iron oxide including metallic iron discharged from the first reactor.

Furthermore, by the present invention, it can be accomplished to prevent the generation of fixed carbon from the reducing and carburizing gas and allow the kind of iron oxide remaining in the product of iron carbide to be magnetite whose chemical character is stable. It also can be accomplished to decrease the quantity of iron ore particle flown outside the reactor.

As a result, the present invention can provide a process and apparatus for producing effectively iron carbide with the high operation ratio and the low production cost.

BRIEF DESCRIPTION OF THE DRAWINGS

FIG. 3 is a figure showing an example of a fluidized bed reactor.

FIG. 3(a) shows a longitudinal sectional view of a fluidized bed reactor whose fluidized bed is partitioned into two parts FIG. 3(b) shows a sectional view at the line III—III of FIG. 3(a).

FIG. 6 is a longitudinal sectional view showing an example of the lower part of the fluidized bed reactor of the present invention.

FIG. 7 is a longitudinal sectional view showing an another example of the lower part of the fluidized bed reactor of the present invention.

FIG. 8 shows a plan view of an example of conventional fluidized bed reactor.

FIG. 9 shows a sectional view at the line IX—IX of FIG. 8.

BEST MODE FOR CARRYING OUT THE INEVNTION

Hereinafter, the embodiments of a process and apparatus for producing iron carbide in accordance with the present invention is explained together with related drawings.

Figure 1:
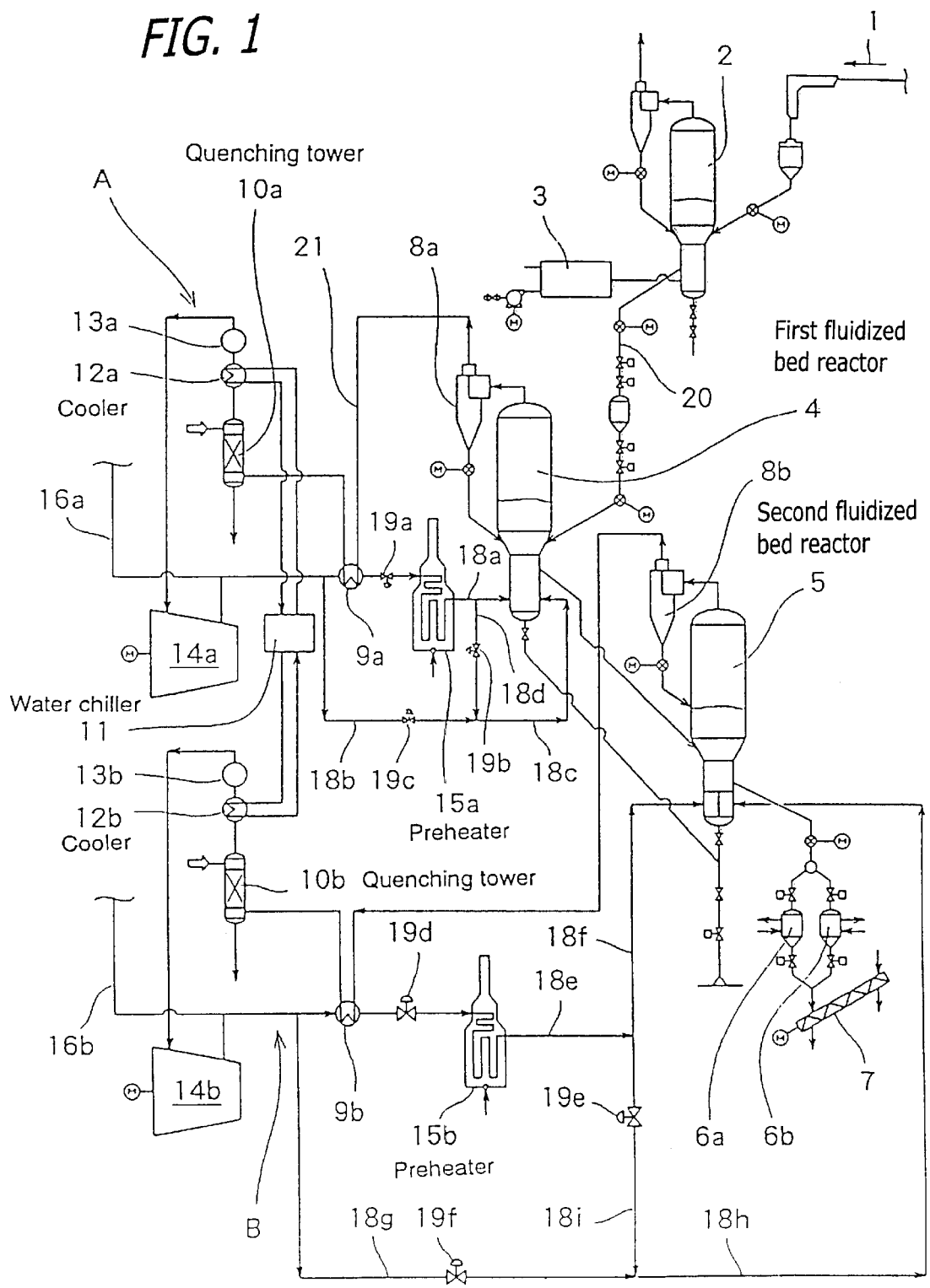
FIG. 1 is a process flow diagram showing example of the entire construction of a process for producing iron carbide of the present invention.

FIG. 1 is a flow diagram showing the entire construction in case of applying the present invention to an apparatus for producing iron carbide having two reactors (two reactor stages). In FIG. 1, grainy raw materials (iron oxide) are charged into an ore dryer 2 as indicated by arrow 1, and said iron oxide is dried in the ore dryer 2 by high temperature gas introduced from hot gas generator 3, and thereafter, said iron oxide is carried to first fluidized bed reactor 4.

In first fluidized bed reactor 4, the grainy iron oxide is preliminarily reduced under fluidizing by the reducing gas introduced from the bottom of said reactor. The preliminarily reduced iron oxide is carried to second fluidized bed reactor 5. In second fluidized bed reactor 5, the grainy preliminarily reduced iron oxide is further reduced and carburized under fluidizing by the reducing and carburizing gas introduced from the bottom of said reactor, and converted into iron carbide. The product (iron carbide) is carried to buffer tank 6a, 6b, and then, transported to a melting furnace such as an electric furnace by means of transportation such as a truck via conveyer 7.

Figure 2:
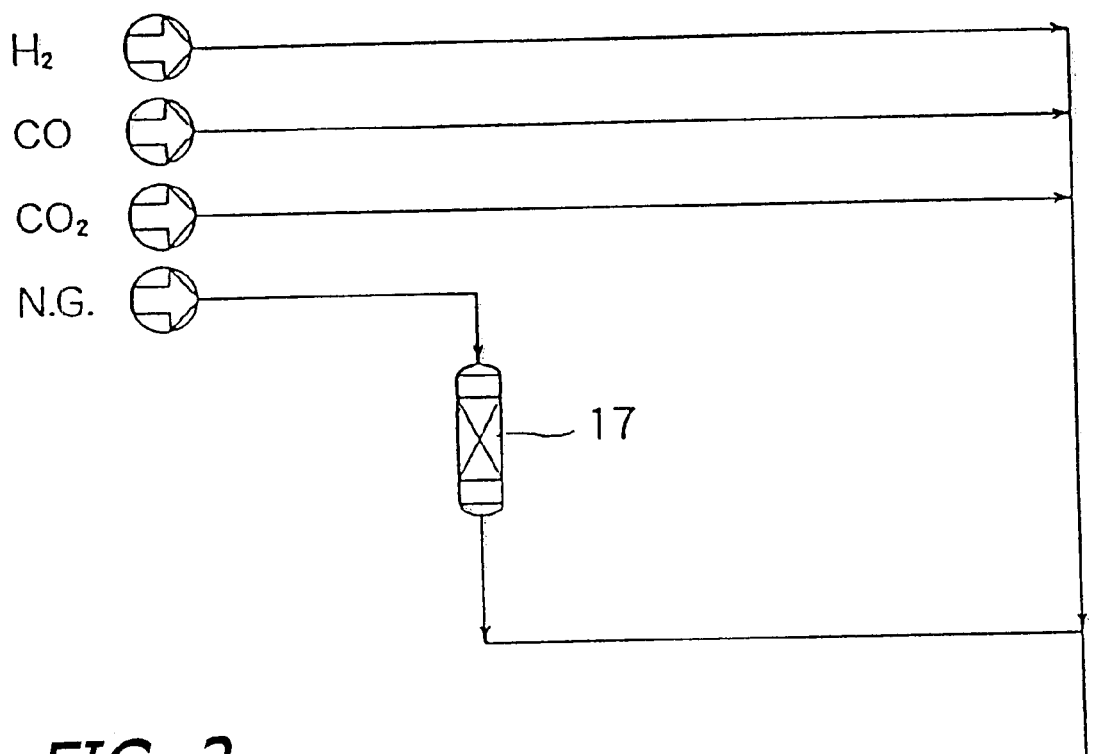
FIG. 2 shows an example of a supply passage of makeup gas.

FIG. 1 shows cyclone separator 8a, 8b, heat exchanger 9a, 9b, quenching tower 10a, 10b, water chiller 11, cooler 12a, 12b, knockout drum 13a, 13b which catch a drop of water and discharge it outside, compressor 14a, 14b, and preheater 15a, 15b. As shown in FIG. 1, both first fluidized bed reactor 4 and second fluidized bed reactor 5 have the individual gas circulation loop A, B respectively. FIG. 2 illustrates that each gas passage 16a, 16b connected to said gas circulation loop is lead to a supply passage of $H_2$ gas, CO gas, $CO_2$ gas or natural gas(NG). In FIG. 2, the numeral 17 shows a desulfurizer. Each chamber, where is located at the lower part of first fluidized bed reactor 4 and second fluidized bed reactor 5, has two gas supply inlets (described after in detail) respectively.

Gas supply line 18a and 18c are connected to gas supply inlets of first fluidized bed reactor 4. Gas supply line 18a is connected to gas supply line 18b via gas supply line 18d. Gas supply line 18f and 18h are connected to gas supply inlets of second fluidized bed reactor 5. Gas supply line 18e is connected to gas supply line 18g via gas supply line 18i. Each of gas supply line 18a, 18d and 18b has gas flow control valves 19a, 19b and 19c respectively. Each of gas supply line 18e, 18i, and 18g has gas flow control valves 19d, 19e, 19f respectively.

FIG. 3 illustrates the detailed constitution of a first fluidized bed reactor or a second fluidized bed reactor.

Chamber 23 locating beneath fluidized bed 22 is separated into two isolated parts 23a, 23b by separation plate 24 and each part 23a, 23b has gas supply inlet 25a, 25b respectively. Fluidized bed 22 is partitioned into division room 22a of the upstream side and division room 22b of the downstream side by partition plate 26.

Fluidized bed 22 and chamber 23 are separated into upside and downside by distribution plate 27. Distribution plate 27 has plural nozzles 28 for introducing gas. The numeral 29 is an inlet for charging raw materials and numeral 30 is an outlet for discharging the product of iron carbide.

In this fluidized bed reactor, under fluidizing, the charged grainy iron oxide existing in division room 22a of the upstream side flows over partition plate 26 and flows into division room 22b of the downstream side. It is possible that the temperature, composition and flow rate of each gas, which is supplied to parts 23a and 23b of chamber 23, may be different each other.

Process for producing iron carbide is described in more detail as follows using the apparatus having the above mentioned constitution.

Grainy iron oxide dried in ore dryer 2 is carried into first fluidized bed reactor 4 via passage 20, and is reduced and carburized under floating and fluidizing by a high temperature (approximately 650° C.) and high pressure (approximately 5 atmospheric pressure) gas being introduced from the bottom portion of the reactor. The reducing and carburizing reaction consumes a large amount of $H_2$ and $CH_4$ and generates a considerable amount of water. Consequently, the gas exhausted at about 600° C. from the top of the reactor contains a considerable amount of water vapor. This high temperature and large moisture-containing gas is cooled along with passing through the gas circulation loop and water vapor contained in the gas is turned into water, and this water is eliminated. After that, $H_2$ and $CH_4$ is supplied to the gas circulation loop. As a result, the reaction in the fluidized bed reactor is expedited more efficiently.

Cooling and circulation of gas in gas circulation loop A is explained in detail hereinafter:

A reaction gas is cooled according to the following steps;
in the first steps, since a reaction gas discharged from the top of the reactor contains extremely fine particles of iron oxides, a part of fine particles of iron oxide are acquired by cyclone separation 8a;
in the second step, a water vapor-containing gas discharged from the reactor at about 600° C. is cooled to 500° C. while going through passage 21;
in the third step, the water vapor-containing gas is cooled to about 220° C. by heat exchanger 9a;
in the fourth step, the gas is cooled to about 40° C. while going through quenching tower 10a to which cool water obtained at cooling tower (not shown) is supplied;
in the fifth step, the gas is cooled to about 20° C. while going through cooler 12a to which cool water generated by water chiller 11 is supplied;
in the final step, water content is eliminated from the gas at knockout drum 13a.

The gas cooled to about 20° C. is pressurized by compressor 14a to about 5 atmospheric pressure, and heated to about 400° C. by a high temperature gas discharged from the reactor at heat exchanger 9a. Further, the gas is returned into fluidized bed reactor 4 after being heated to about 650° C. at preheater 15a.

The gas having desirable components is supplied via a gas supply passage as shown in FIG. 2 because the circulating gas is gradually consumed according to the proceeding of the reaction in the reactor.

The above mentioned reaction in a gas circulation loop A also takes place in a gas circulation loop B.

According to the above mentioned process, the iron oxide charged into first fluidized bed reactor 4 is converted to iron carbide ($Fe_3C$) at second fluidized bed reactor 5 and said iron carbide is discharged from the reactor.

By the way, in components of iron oxide, wustite is chemically unstable and magnetite is chemically stable.

When the temperature of reaction gas is in the range of 500° C. to about 600° C., wustite is not generated but magnetite is generated according to the equilibrium of Fe—H—O and Fe—C—O.

The iron oxide component, which remains in the product of iron carbide, is preferably magnetite. On the other hand, it is preferable to raise the temperature of reaction gas more than about 600° C. (for example 590° C.) in order to increase the reaction speed. Therefore, in this embodiment, gas supply line 18g, which can carry some amount of low temperature gas (gas at inlet side of preheater), is connected to line 18h supplying gas to a division room of the downstream side. As a result, it is possible that the temperature of gas to be supplied to a division room of the downstream side is controlled in the range of 500° C. to 600° C. and the temperature of the gas to be supplied to a division room of the upstream side is controlled to be over about 600° C.

As is described above, in the present invention, it is possible that the temperature of each gas, which is supplied to a division room of the upstream side and a division room of the downstream side, may be different each other. It is also possible to make the gas flow rate and the gas composition for one division room different from those of the other division room in the same manner.

Figure 4:
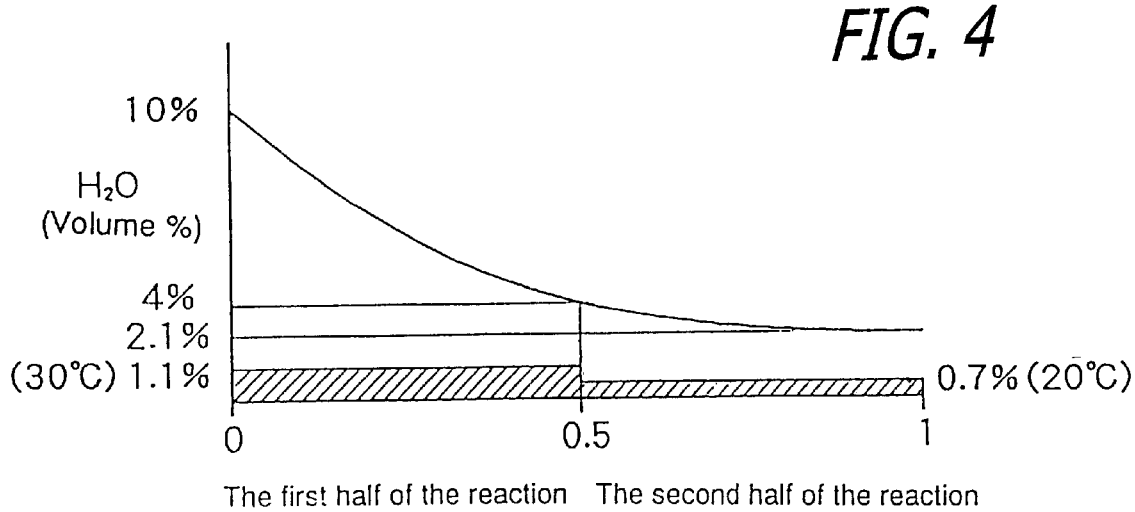
FIG. 4 is a figure showing the change of the amount of water generated by the reducing reaction of iron oxide during the batch test.
Figure 5:
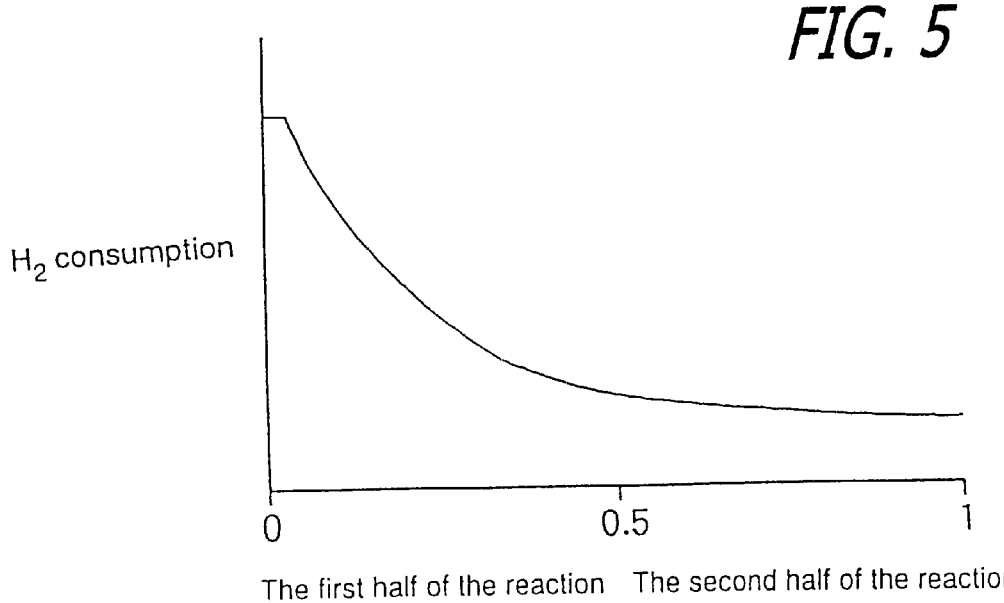
FIG. 5 is a figure showing the change of the amount of hydrogen consumed by the reducing reaction of iron oxide during the batch test.

For example, as shown in FIG. 4 and FIG. 5, since the reducing reaction by hydrogen gas is sufficiently conducted at the mature stage of the reaction, it is desired to make the hydrogen concentration contained in gas to be supplied to a division room of the upstream side larger than that contained in gas to be supplied to a division room of the downstream side.

In accordance with the present invention, even if this reaction is conducted in a single fluidized bed reactor, it is possible to make the hydrogen concentration contained in gas in the upstream side different from that contained in gas in the downstream side by means of introducing hydrogen gas into the gas to be supplied to a division room of the upstream side.

Generally, the high temperature gas containing hydrocarbon such as methane and carbon monoxide may generate a fixed carbon under a certain conduction. The fixed carbon has the following defects. One of the defects is that the fixed carbon consumes uselessly the reaction gas. The other defect is that the fixed carbon sticks to equipments such as heater and the like. The another defect is that the fixed carbon invades into the material constituting the equipment, and damages said material. The fixed carbon is not generated when a large amount of water is contained in the gas. In the conventional process for producing iron carbide, as shown in FIG. 4 and FIG. 5, there is much water in the early stage of reaction because of the large reducing reaction speed by hydrogen, and the fixed carbon is not easily generated. But, in the final stage of reaction, since the reaction speed is low, the water generated by the reaction is a little and fixed carbon is liable to be generated. Consequently, in accordance with the present invention, it is possible to raise the water concentration contained in gas to be supplied to the division room of the downstream side via line 18g and 18h by adding steam.

It is preferable to lower the concentration of methane and carbon monoxide contained in gas in order to prevent the generation of fixed carbon. But, if the concentration of carbon monoxide and methane is lowered, it results in the decrease of the reaction speed, namely, the lowering of the productivity. Therefore, in accordance with the present invention, it is possible to lower the concentration of methane and carbon monoxide contained only in gas of the last division room of the downstream side by means of restraining the quantity of hydrocarbon and carbon monoxide to be introduced into gas to be supplied to the last division room of the downstream side.

The specific gravity of iron oxide become lower and the diameter of iron oxide particle become smaller in accordance with the proceeding of the reaction. Therefore, the iron oxide particle at the second half of the reaction is liable to fly. Since this flown particle is apt to stay in a short time in the reactor, the carburization degree becomes low, and the average carburization degree of the product of iron carbide becomes low. Accordingly, it is preferable to regulate the gas flow velocity passing through fluidized bed according to the proceeding of reaction. In accordance with the present invention, it is possible to lower the gas flow rate to be supplied to the division room of the downstream side less than that to be supplied to the division room of the upstream side by means of controlling gas flow control valves (19a~19f) installed on gas supply lines.

Furthermore, in the conventional process wherein the reducing reaction is partially conducted in first reactor, and the further reducing and carburizing reaction are conducted in second reactor, it is necessary to control the reduction degree of iron ore at the first reactor. For that purpose, said control of reduction degree may be achieved by means of altering the flow rate, the temperature and the composition of the gas flowing in the reactor.

But it is not easy to change the above factors because of a great deal of gas. Consequently, it is difficult to obtain a conformable and careful control.

In accordance with the present invention, however, it is possible to control uniformly the gas condition to be supplied to the division rooms except the final division room in plural division rooms of a first fluidized bed reactor, besides it is possible to easily alter the flow rate, the temperature and the composition of only the gas to be supplied to the final division room.

FIG. 6 shows that fluidized bed is partitioned into division rooms 22c, 22d, 22e by partition plate 26 and separation plate 24 separating chamber 23 is installed on the upper part of the chamber. A part of gas introduced from gas supply inlet 25a flows into portion 23b. Since this gas is mixed with gas introduced from gas supply inlet 25b, it is possible to make the gas component introduced into division room 22e of the downstreammost different from the gas component introduced division rooms 22c and 22d of the upstream side.

FIG. 7 shows that separation plate 24 separating chamber 23 is installed from the top of the chamber to the bottom thereof. Separation plate 24 has aperture 24a in the lower part, and part 23a is communicated with part 23b via aperture 24a. It seems that this embodiment may achieve the same function as the embodiment shown in FIG. 6.

In case of plant having the production capacity of iron carbide of more than 200,000 ton per year, it is preferable that the division number of fluidized bed is 6~7 and the separation number of chamber is two.

INDUSTRIAL APPLICABILITY

Since the present invention has the above constitution, the apparatus according to the present invention is suitable for the apparatus to efficiently produce iron carbide having the chemically stable component.

What is claimed is:

1. A process for producing iron carbide by an apparatus having elements (a) to (e);
   (a) a fluidized bed located at an upper part within a fluidized bed reactor, and,
   (b) a chamber located at a lower part within the reactor to work as a gas header for introducing a reducing and carburizing gas;
   wherein the fluidized bed and the chamber are separated into upside and downside by a distribution plate on which multiple gas introducing nozzles are installed; and the fluidized bed located at an upper part of the distribution plate is partitioned into plural division rooms which are formed in an isolated or mazy room by a partition plate, there being at least one upstream side reduction stage division room and at least one downstream side carburization stage division room being in fluid communication above said partition plate within said chamber; and,
   (c) plural gas supply inlets arranged on the chamber for supplying gas respectively to specific ones of the division rooms, and, a separate gas supply line being connected to each of at least two inlets of said plural gas supply inlets in order to supply reducing and carburizing gases separately to said at least two inlets,
   (d) wherein each gas supply line has a gas flow control valve for controlling a different pressure or flow rate of the gas supplied to the downstream side carburization stage division room relative the pressure or flow rate of the gas supplied to the upstream side reduction stage division room, and comprising the step of providing a different pressure or flow rate in said carburization stage division room relative the pressure or flow rate in said reduction stage division room; and
   (e) a gas supplying apparatus through which hydrogen gas and carbon-containing gas such as methane are supplied to a gas circulation loop; and further, comprising the steps for reacting grainy iron oxide charged from a side wall of the reactor with the gas in such a manner that;
   the iron oxide is floated and fluidized by gas being introduced from the bottom portion of the reactor, and then, transferred from the division room of the upstream side to the division room on the downstream side via said fluid communication above said partition plate, and finally, produced iron carbide is discharged from the final division room.

2. The process for producing iron carbide of claim 1, wherein said chamber is separated into plural parts by a separation plate and at least two of said plural parts each has a separate individual gas supply inlet.

3. The process for producing iron carbide of claim 2, wherein a separation plate is installed at the upper part of the chamber in such a manner that only the upper part of the chamber is divided into plural parts by said separation plate.

4. The process for producing iron carbide of claim 2, wherein a separation plate is installed from the top of the chamber to the bottom thereof for isolating each separation part.

5. The process for producing iron carbide of claim 2, wherein a separation plate is installed from the top of the chamber to the bottom thereof for separating the chamber into plural parts, and the separated part communicates with the adjacent separated part through an aperture provided on the separation plate.

6. The process for producing iron carbide of claim 1, wherein the amount of water vapor contained in the gas supplied to the carburization division room is made larger than that contained in the gas supplied to the reduction stage division room.

7. The process for producing iron carbide of claim 6 wherein the amount of water vapor contained in the gas supplied to the carburization division room is increased by supplying water vapor from the outside of the reactor.

8. The process for producing iron carbide of claim 6, wherein one or more gas circulation loops having a quenching tower and a cooler which reduce water vapor contained in gases circulated through said loops and wherein the amount of water vapor contained in the gas supplied to the carburization division room is increased so that the cooling operation of the quenching tower in one of said gas circulation loops is regulated so as to decrease the amount of removal of water vapor by said quenching tower and the cooling operation of the cooler in a gas circulation loop is regulated so as to decrease the amount of removal of water vapor by said cooler.

9. The process for producing iron carbide of claim 1, wherein the hydrocarbon gas or the carbon monoxide gas contained in the gas to be supplied to the carburization division room is made smaller than that contained in the gas supplied to the reduction stage division room.

10. The process for producing iron carbide of claim 9, wherein the amount of the hydrocarbon gas or the carbon monoxide gas contained in the gas supplied to the reduction stage division room of the upstream side is made larger than that contained in the gas supplied to the carburization division room of the downstream side by supplying hydrocarbon gas or carbon monoxide gas from the outside of the reactor.

11. The process for producing iron carbide of claim 4, wherein the gas flow rate per unit area of the gas supplied to the carburization division room is made smaller than that of the gas supplied to the reduction stage division room.

12. The process for producing iron carbide of claim 1, wherein the temperature of the gas supplied to the carburization division room is made lower than that of the gas supplied to the reduction stage division room.

13. The process for producing iron carbide of claim 12, wherein a gas preheater is provided in a gas circulation loop for heating the gas and wherein the temperature of the gas supplied to the carburization division room is made lower by mixing other gas having a lower temperature than the gas discharged from the preheater in the gas circulation loop with said discharged gas.

14. The process for producing iron carbide of claim 13, wherein the other gas is a part of the gas supplied to a preheater.

15. The process for producing iron carbide of claim 13, wherein the other gas is supplied from the outside of the reactor.

16. The process for producing iron carbide of claim 12, wherein the temperature of the fluidized bed in the division room of the downstream side is made in the range of 500–600° C.

17. The process for producing iron carbide of claim 16, wherein the temperature of the fluidized bed in a last division room of the downstream side is made in the range of 500–600° C. by decreasing the temperature of only the gas supplied to said last division room.

18. The process for producing iron carbide of claim 12, wherein the temperature of the gas supplied to the carburization division room is made lower than that of the gas supplied to the reduction stage division room in such a manner that oxygen is mixed with the gas supplied to the reduction stage division room and then, a part of combustible gas contained in said gas is partially burned in order to raise the gas temperature.

19. The process for producing iron carbide of claim 4, wherein the concentration of hydrogen contained in the gas supplied to the reduction stage division room is made higher than that of hydrogen contained in the gas supplied to the carburization division room.

20. The process for producing iron carbide of claim 19 wherein the concentration of the hydrogen in the gas supplied to the reduction stage division room is increased by supplying hydrogen gas from the outside of the reactor.

* * * * *